H. F. Hart.
Register of Odometers.
No. 72,033.  Patented Dec. 10, 1867.

Witnesses.
Theo Tincke
W. Trewin

Inventor.
H. F. Hart
Per Munn & Co.
Attorneys

UNITED STATES PATENT OFFICE.

H. F. HART, OF NEW YORK, N. Y.

IMPROVEMENT IN REGISTERS FOR ODOMETERS.

Specification forming part of Letters Patent No. 72,033, dated December 10, 1867.

*To all whom it may concern:*

Be it known that I, HENRY F. HART, of the city, county, and State of New York, have invented a new and useful Improvement in Machines for Registering Numbers for Odometers and other Purposes; and I do hereby declare that the following is a full, clear, and exact description thereof, which will enable those skilled in the art to make and use the same, reference being had to the accompanying drawings, forming part of this specification, in which—

Figure 1:
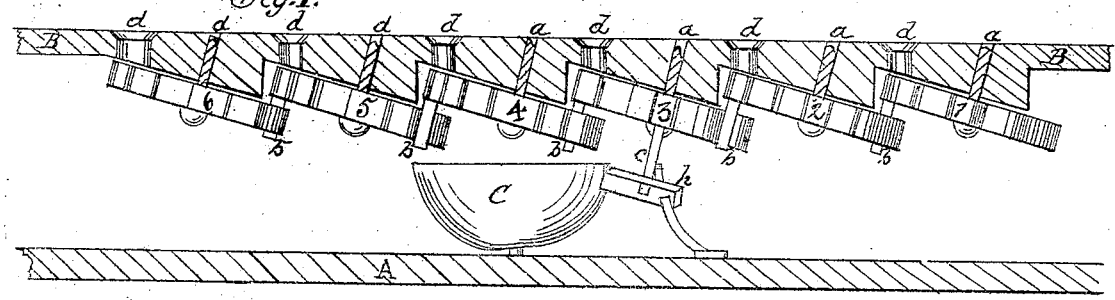
Figure 2:
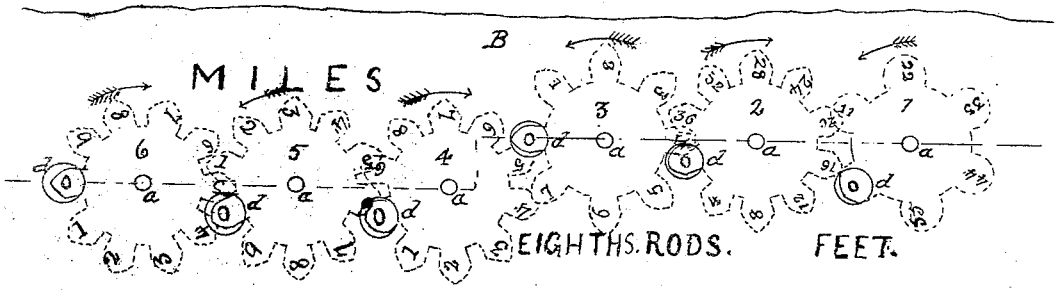
Figure 3:
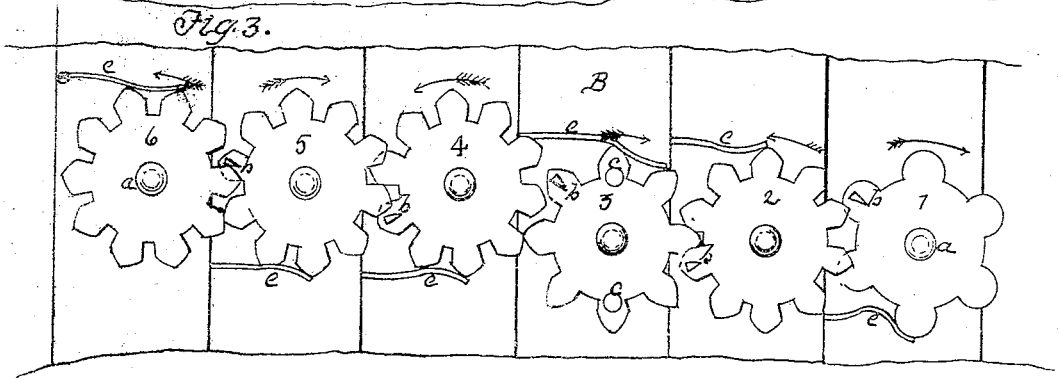

Figure 1 is a side view of my improved registering apparatus within a case; Fig. 2, a top view of the apparatus, showing the registering-numbers on the cogs of the wheels in red under the cover of the case; Fig. 3, a bottom view of the apparatus within the case.

Similar letters of reference indicate corresponding parts.

This invention relates to a new and improved machine or apparatus for registering numbers applicable to odometers or measurements of quantities of all kinds, such as the numbers of barrels of flour, bushels of grain, or any other commodity that requires a tally or record of the quantity packed, stored, weighed, or handled in any manner, and applicable also to machinery of all kinds to register the revolutions of wheels decimally.

This improvement consists in a combination of cog-wheels so arranged in relation to each other that the power of the numbers is raised in the successive wheels by a graduated scale of measurement, beginning at zero on each wheel, so that any number of units of measurement produced by the motive power shall be registered up to any required quantity or sum of units of measurement designated by multiples of the lesser measurements according to the scale of divisions of quantities employed. Connected with the apparatus is a signal-bell, which strikes to mark any desired number of units of measurement that are registered.

The drawings represent my registering apparatus applied as an odometer; but it will be understood that the principle of operation and plan of arrangement are the same for all purposes.

A represents the bottom of a case inclosing the apparatus, in which a series of registering-wheels, Nos. 1 2 3 4 5 6, are hung on the under side of the box lid or top B. These wheels are suspended on short pins *a a* in an inclined position, with the cogs or leaves overlapping each other instead of engaging in the usual way; and on one cog of each wheel is a side pin or tappet, *b*, that catches a cog on the wheel next above it in the series, and thus moves it one cog forward at every revolution of the wheel which carries the pin *b*. The cogs on the wheels are marked with figures on one side designating units or divisions of measurement in the ascending scale of numbers which the wheels represent respectively. The lid B of the case is pierced with holes *d d*, covered with glass, to observe the figures on the cogs of the wheels as they move around to register the measurement of movement; and each wheel in the series represents some division or multiple of a unit of measurement. For example, wheel No. 1 represents subdivisions of rods in feet; wheel No. 2 represents subdivisions of eighths of a mile in rods; wheel No. 3 represents subdivisions of miles in eighths of a mile, and Nos. 4 5 6 represent units, tens, and hundreds of miles, respectively, the scale of measurement ascending in order from wheel No. 1 to No. 6. The apparatus shown in the drawings thus registers distances of feet, rods, eighths of a mile, and miles up to one thousand miles, which the vehicle to which it is attached may travel.

Wheel No. 1 has six cogs, and is marked for connection with a carriage-wheel measuring eleven feet in circumference, so that each revolution of the carriage-wheel shall move wheel No. 1 the space of one cog, and each of its revolutions shall thus register sixty-six feet, or four rods, which last distance is the unit of measurement registered by the movement of wheel No. 2 for the space of one cog by the spur *b* on wheel No. 1. Wheel No. 2 has ten cogs, and each of its revolutions registers forty rods, or the eighth of a mile, which is the unit of measurement registered by wheel No. 3. This wheel has eight cogs to measure one mile in its revolution, which is the unit of measurement registered by wheel No. 4. This wheel registers the miles up to ten, while wheel No. 5 registers tens of miles, and wheel No. 6 registers hundreds of miles up to one thousand. The several wheels in the series therefore indicate in whole numbers and divisions the distance traveled; and a signal-bell, C, may also be placed in the case to ring at every half-mile by placing pins or tappets *c c* at equidistant points on wheel No. 3, which pins shall move a hammer, *h*, to strike the bell at each half-revolution. Thus signals can be arranged at any point of measurement.

The springs *e e* are placed at the sides of the wheels to hold them in place.

It is evident that the scale of numbers or units of measurement can be varied as desired, to adapt the apparatus to different purposes, by changes in the number of the wheels and cogs employed and their relations to each other.

By forming the lid B with notches resembling ratchet-teeth upon its under side, and by pivoting the counting-wheels thereto in an inclined position, I am enabled to use shafts or screws of equal length for securing said wheels to the lid, thereby saving a large amount of room which would otherwise be occupied if the wheels were placed in a horizontal position.

Having described the construction and operation of my invention, I claim as new and desire to secure by Letters Patent—

The arrangement in an inclined position of the counting-wheels 1, 2, 3, 4, 5, and 6 upon shafts of equal lengths, in combination with the notched and perforated lid B, as herein shown and described.

H. F. HART.

Witnesses:
WM. F. MCNAMARA,
ALEX. F. ROBERTS.